United States Patent [19]
Weghaupt et al.

[11] Patent Number: 4,577,871
[45] Date of Patent: Mar. 25, 1986

[54] DEVICE FOR COUPLING TWO SHAFTS OF A ROTATING MACHINE FOR HEAT TRANSFER AND SEALING

[75] Inventors: Erich Weghaupt, Mulheim an der Ruhr; Lutz Intichar; Christoph Schnapper, both of Erlangen, all of Fed. Rep. of Germany

[73] Assignee: Kraftwerk Union Aktiengesellschaft, Mulheim an der Ruhr, Fed. Rep. of Germany

[21] Appl. No.: 706,045

[22] Filed: Feb. 27, 1985

[30] Foreign Application Priority Data

Feb. 28, 1984 [DE] Fed. Rep. of Germany ....... 3407275

[51] Int. Cl.$^4$ .......................... F16J 15/00; H02K 9/00
[52] U.S. Cl. ............................................ 277/8; 277/12; 277/200; 277/212 FB; 310/10
[58] Field of Search ......................................... 277/5–8, 277/12, 32, 200, 212 FB; 310/10, 52, 90

[56] References Cited

U.S. PATENT DOCUMENTS

| 227,419 | 5/1880 | Dresser | 277/5 |
| 3,246,902 | 4/1966 | Harrison | 277/8 |
| 4,126,321 | 11/1978 | Harjar et al. | 277/200 X |
| 4,323,801 | 4/1982 | Weghaupt et al. | 310/52 |

FOREIGN PATENT DOCUMENTS

| 3019864 | 5/1982 | Fed. Rep. of Germany . | |
| 53-41705 | 4/1978 | Japan | 310/10 |
| 173470 | 11/1960 | Sweden | 277/8 |
| 173588 | 12/1960 | Sweden | 277/212 FB |
| 552907 | 8/1974 | Switzerland . | |
| 998617 | 7/1965 | United Kingdom | 277/8 |

*Primary Examiner*—Robert S. Ward
*Attorney, Agent, or Firm*—Herbert L. Lerner; Laurence A. Greenberg

[57] ABSTRACT

A device for coupling two shafts of a rotating machine for permitting simultaneously a thermal dilatation and a sealing of the shafts with respect to each other, in combination with the shafts, includes inner and outer normally synchronously rotating mutually concentric shafts defining a ring gap therebetween, at least the outer shaft being hollow defining a space between the shafts, an expansion compensator with a given maximal permissible twist disposed between the inner periphery of the outer shaft with one end and the outer periphery of the inner shaft with its other end sealing the space between the shafts and permitting relative axial, radial and tangential motion between the shafts, a holding ring rotatably and sealingly supported on the inner shaft connected sealingly to said other end of the expansion compensator thereby permitting a twisting movement thereof with respect to the inner shaft, and at least one driver element attached to the outer shaft engaging the inner shaft via the holding ring with tangential play ($S_2$) between the shafts being smaller than the given maximal permissible twist, the driver element mechanically connecting the holding ring, and the other end of said expansion compensator to the outer shaft when twists of the expansion compensator exceed the tangential play ($S_2$).

8 Claims, 2 Drawing Figures

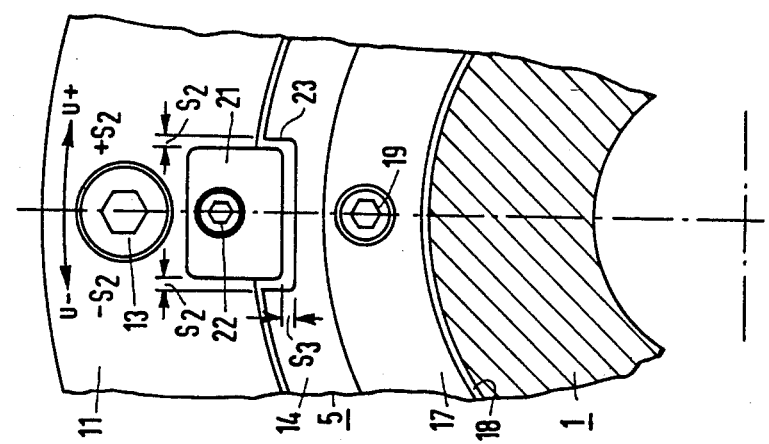
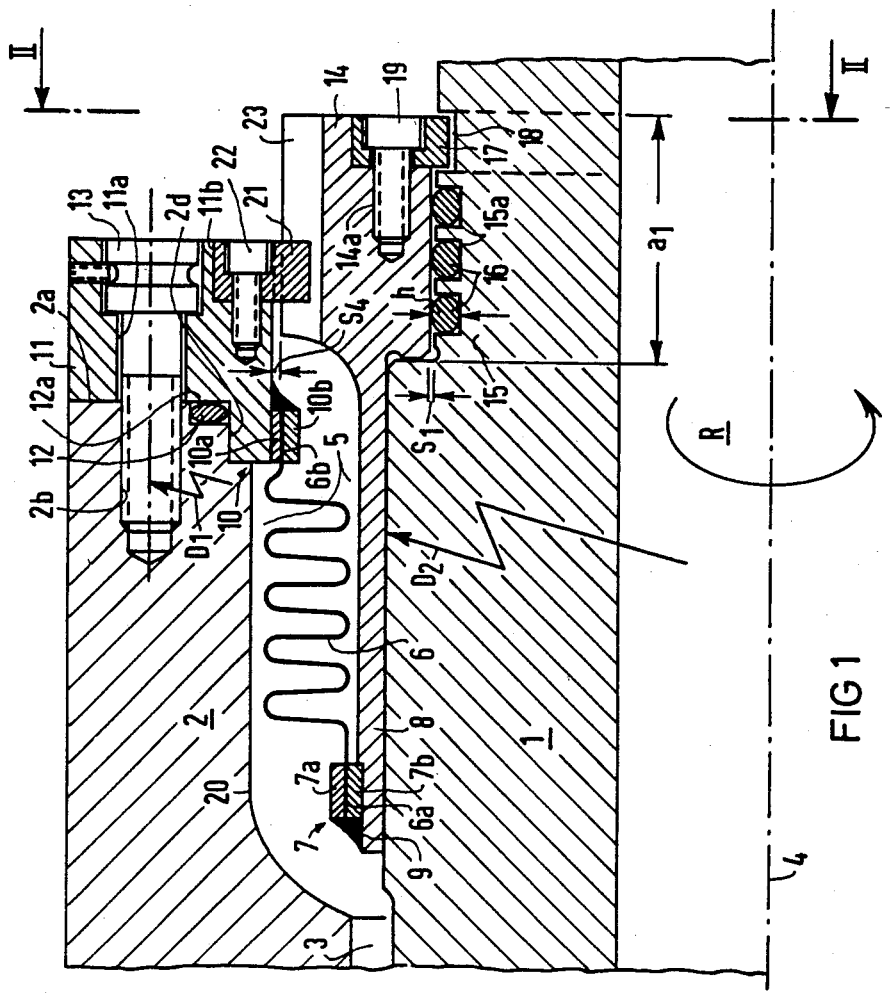

DEVICE FOR COUPLING TWO SHAFTS OF A ROTATING MACHINE FOR HEAT TRANSFER AND SEALING

The invention relates to a device for coupling two shafts of a rotating maching for heat transfer or thermal mobility and sealing in combination with two normally synchronously rotating mutually concentric shafts defining an annual gap therebetween, at least the outer shaft being a hollow shaft defining a space between the shafts, and an expansion compensator fastened between the inner periphery of the outer shaft and the outer periphery of the inner shaft forming a seal, the expansion compensator permitting relative axial, radial and tangential motion between the shafts.

Such a device particularly involves an electric machine and preferably the generator rotor of a turbogenerator with a superconducting field winding. In this preferred field of application, a device of this kind is known from Swiss Pat. No. CH-PS 552 907 and from German Published, Non-Prosecuted Application No. DE-OS 29 18 763 corresponding to U.S. Pat. No. 4,323,801. In these known devices, the inner shaft as well as the outer shaft are provided as hollow shafts. The gap between these two inner and outer hollow shafts, which revolve synchronously in normal operation, must be sealed against overpressure from the outside. This is because the gap must be sealed for reasons of thermal insulation of the cryogenic coolant, especially helium, which circulates in the interior of the inner hollow shaft parts, and is at a temperature level close to absolute zero. The shaft seal with its expansion compensator required therefor must be capable of withstanding axial shaft displacements in the range of centimeters and radial and axial shaft vibrations of the two inner and outer shaft parts relative to each other of maximally 1 to 2 tenths of a millimeter without damage, and further torsional vibrations of the two shaft parts relative to each other in the range of permissible twist angles of the expansion compensator and occasionally briefly occurring large twists of the two hollow shaft parts relative to each other of several degrees of angle.

In high-speed machines, the speed of rotation of which is higher than 50 sec$^{-1}$, shaft vibrations cannot be avoided. These have a particular effect on the sealing of the gap of two concentrically disposed hollow shafts. As mentioned above, the special problems in such shaft constructions are that, on one hand, mobility of the two coaxial shaft parts relative to each other in the axial, radial and tangential direction should be possible, and on the other hand, provision should be made for a reliable seal of the gap between the two shaft parts with an expansion compensator, without damaging the expansion compensator. In the radial direction, a vibration amplitude of maximally 100 $\mu$m of the hollow shafts of a superconducting generator can be expected relative to each other during operation. During normal operation, the vibrations in the tangential direction reach about the same magnitude. Both vibrations act continuously and must be absorbed by the expansion compensator. The situation is entirely different with the relative axial displacements of the two shaft parts and the larger relative angular twists which only temporarily occur under certain operating conditions of the machine, i.e. relatively rarely. With appropriate construction, the expansion compensator can quite adequately take up large axial shaft displacements, especially since these motions take place very slowly. However, the expansion compensator is not capable of withstanding twisting motions of the two hollow shafts of several centimeters relative to each other, since it is very stiff against twists. Furthermore, an increase of the number of compensator shafts would not lead to the desired result, especially since very large expansion compensators are involved which surround a shaft diameter of more than 500 mm. In addition, only a limited space for installation is available in the axial direction so that the overall torsional elasticity could not be additionally improved, even through the use of a greater length of the expansion compensator.

German Pat. No. DE-PS 30 19 864 defines the more stringent requirements which must be met by a high-vacuum seal of the ring gap in a superconducting generator rotor as follows:

(a) Between the hot condition and the cold condition of the generator rotor, axial displacement of, for instance 20 to 25 mm result due to thermal dilatation, which must be taken up by the high-vacuum seal.

(b) In normal operation, the high-vacuum seal must take up small torsional vibrations between the hollow journal and the bearing journal, and tangential twists can also result in the millimeter range due to short circuit torques in special operating cases.

(c) The high-vacuum seal must be able to take up high frequency radial vibrations between the hollow journal and the bearing journal, the amplitude of which is, for instance, 10 to 20 $\mu$m in normal operation, and this amplitude can also be increased temporarily when sweeping through resonance positions.

(d) The high-vacuum seal must also be able to additionally take up high-frequency radial stresses which can come about due to changes in the bearing alignment in the horizontal and/or vertical direction with corresponding eccentric positions of hollow journals and bearing journals.

(e) Due to the relatively large diameter of the high-vacuum seal of at least 500 to 600 mm which is relatively large for mechanical design reasons, the high-vacuum seal must be of such a nature that it can take up relatively high intrinsic centrifugal force stresses.

(f) The high-vacuum seal is expected to have a long service life and great maintenance friendliness, i.e. it must ensure uninterrupted operating periods of the generator of at least 20,000 to 25,000 hours and must be interchangeable with little assembly effort in the case of an inspection.

In German Pat. No. DE-PS 30 19 864, a generator rotor was proposed for solving this combination of problems (a) to (f), the high-vacuum seal of which is constructed as a contactless liquid seal, having a magnetic barrier liquid which is kept in the seal gap by a magnetic field, wherein the liquid seals are connected to a concurrently rotating sealing-liquid reservoir.

It is accordingly an object of the invention to provide a device for coupling two shafts of a rotating machine for heat transfer and sealing, which overcomes the hereinafore-mentioned disadvantages of the heretofore-known devices of this general type, such as the combination of problems (a) to (f) listed above, and which uses only one expansion compensator, while permitting the high-vacuum seal to be simplified and its cost to be reduced.

With the foregoing and other objects in view there is provided, in accordance with the invention, a device for coupling two shafts of a rotating machine for permitting simultaneously a thermal dilatation and a sealing of the shafts with respect to each other, in combination with the shafts, comprising inner and outer normally synchronously rotating mutually concentric shafts defining a ring gap therebetween, at least the outer shaft being hollow defining a space between the shafts, an expansion compensator with a given maximal permissible twist disposed between the inner periphery of the outer shaft with one end and the outer periphery of the inner shaft with its other end sealing the space between the shafts and permitting relative axial, radial and tangential motion between the shafts, a holding ring rotatably and sealingly supported on said inner shaft connected sealingly to said other end of the expansion compensator thereby permitting a twisting movement thereof with respect to said inner shaft, and at least one driver element attached to the outer shaft engaging the inner shaft via the holding ring with tangential play ($S_2$) between the shafts being smaller than the given maximum permissible twist, the driver element mechanically connecting the holding ring and the other end of said expansion compensator to the outer shaft when twists of the expansion compensator exceed the tangential play ($S_2$).

In accordance with another feature of the invention, the tangential play is substantially equal in the clockwise and counterclockwise directions during normal operation.

In accordance with a further feature of the invention, the inner shaft and the holding ring have metallic counter sealing surfaces, and including sealing rings disposed between the inner shaft and the holding ring, and a sliding medium such as PTFE disposed on the sealing surfaces and the sealing rings.

In accordance with an added feature of the invention, the inner shaft has a given maximum radial vibration amplitude during operation, the driver element is a driven dog, the outer shaft includes a shaft portion holding the driver dog, the inner periphery of the shaft portion is spaced from the outer periphery of the holding ring defining a ring gap and radial play ($S_4$) limiting radial movement of the inner shaft being larger than the given maximum radial vibration of the inner shaft, the driver dog dips into an axial slot formed in the outer periphery of the holding ring defining a slot bottom, and the driven dog has radial play ($S_3$) toward the slot bottom being larger than the radial play ($S_4$) between the holding ring and shaft portion, where:

$$|S_2| > S_4$$

and $$|S_2| \geqq S_3.$$

In accordance with an additional feature of the invention, the outer shaft has an end face and a shoulder, the shaft portion is a flange ring, and including threaded bolts clamping the flange ring against the end face forming a seal and centering the flange ring against the shoulder, the inner periphery of the flange ring serving as a fastening surface for said one end of the expansion compensator opposite its other end.

In accordance with again another feature of the invention, the axially outer end of the flange ring has at least one recess formed therein in which the driver dog is received and fastened.

In accordance with a concomitant feature of the invention, the axially outer end of the flange ring has at least two recesses formed therein and distributed over the inner periphery of the flange ring and the outer shaft, one of the driver dogs being disposed and fastened in each respective recess.

The advantages attainable through the use of the invention are in particular that a high-vacuum seal has been created, using an expansion compensator, which can withstand all stresses occurring during the operation of a superconducting generator and which can also be provided in a service-friendly construction.

Other features which are considered as characteristic for the invention are set forth in the appended claims.

Although the invention is illustrated and described herein as embodied in a device for coupling two shafts of a rotating machine for heat transfer and sealing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary, diagrammatic, axial-sectional view of portions of a shaft which are of interest concerning the invention with an expansion compensator disposed therebetween; and FIG. 2 is a fragmentary cross-sectional view normal to the axis along the cross-sectional plane II—II in FIG. 1, in the direction of the arrows.

The preferred embodiment described below is an improvement of a hollow shaft construction of a superconducting generator, such as is described in German Published, Non-Prosecuted Application No. DE-OS 29 18 763, corresponding to U.S. Pat. No. 4,323,801, especially FIGS. 1 and 2 thereof, to which reference is expressly made in order to avoid repetition. According to the invention, however, the expansion compensator is fastened in a different manner than in the above-mentioned publications and is provided with a protective device as explained below.

Referring now to the figures of the drawing in detail and first particularly to FIG. 1 thereof, there is seen a rotor R of a superconducting turbogenerator with an inner hollow shaft 1 and an outer hollow shaft 2 having a space 5 therebetween. Both hollow shafts 1 and 2 are constructed and disposed in such a way that they can rotate synchronously about a rotor axis 4, while being separated from each other by an annular gap 3. Normally, an underpressure relative to the outer space prevails in the ring gap 3; however, an overpressure can also prevail in the ring gap 3 relative to the outer space, so that the ring gap 3 must be sealed in a precise manner against the outer space. The seal is formed of an expansion compensator 6 which is referred to below as a compensator for short. The left end 6a of the compensator is disposed between two layers 7a, 7b of a left reinforcement ring 7 and is connected by means of the reinforcement ring to a holding ring 8 at the left end of the outer periphery thereof through the use of a welding seal 9. The right compensator end 6b is secured between two layers 10a, 10b of a right reinforcement ring 10 and is welded to a flange ring 11 and specifically to the inner periphery of the flange ring. The flange ring 11 is sealed by an O-ring 12 inserted in a circular slot 12a formed in an end face 2a of the hollow shaft 2. The flange ring 11 is firmly bolted to the hollow shaft 2 with a threaded bolt 13 inserted through a hole 11a formed in the flange ring 11 as well as through tapped holes 2b formed in the end face 2a of the hollow shaft 2. The bores and elements 2b, 11a, 13 are distributed on a pitch circle with a diameter D1. The flange ring 11 is centered with an annular shoulder at a shoulder 2d of the hollow shaft. The holding ring 8 enclosing the inner hollow shaft 1 is supported along its inner periphery having a diameter D2 on the outer periphery of the inner hollow shaft 1 with a sliding fit. The right end of the holding ring 8 has a radially inwardly and outwardly projecting enlargement 14 which surrounds a shoulder 15 of the shaft 1 with a gap spacing $S_1$ therebetween which runs along an axial length $a_1$ of the shaft shoulder 15. The holding ring 8 is sealed by O-rings 16 at the left shoulder 15 against the inner hollow shaft 1. The O-rings 16 are inserted into circular slots 15a formed in the outer periphery of the shaft shoulder 15; three O-rings 16 axially following each other and corresponding circular slots 15a are shown. The axial locking of the rotatably supported holding ring 8 is accomplished by at least one segment 17 which rotatably engages a circumferential shaft 18 of the hollow shaft 1. The segment 17 is connected to the enlargement 14 of the holding ring 8 by means of bolts 19 screwed into tapped holes 14a. In vicinity of the compensator 6, the outer hollow shaft 2 is cut in or recessed for receiving the seal. A compensator receiving chamber 5 communicating with the ring gap 3 is formed by a recess or cut 20.

A driver element in the form of a driver dog 21 is fitted and bolted down into the flange ring 11 by a bolt 22. The driver dog 21 engages an axial slot 23 formed in the outer periphery of the holding ring enlargement 14.

FIG. 2 shows a cross section taken along the plane II—II of FIG. 1. As seen in FIG. 2, tangential play $S_2$ is provided on both sides between the driver dog 21 and the axial slots 23 in the circumferential direction. The tangential play is designated with reference numerals $+S_2$ and $-S_2$ corresponding to two directions of rotation $\pm u$. In the radial direction, radial play $S_3$ is provided between the driver dogs 21 and the axial slot 23. The radial limitation of the relative motion between the inner and outer hollow shaft parts 1, 2 takes place between the outer periphery of the holding ring 8 and the inner periphery of the flange ring 11 by providing a radial limitation gap $S_4$ shown in FIG. 1 which is smaller than $S_3$. Since the plane of vibration of radial shaft excursions lie not only in the vertical axial plane, but can also lie in axial planes rotated relative thereto, and since for such excursions $S_4$, the smallest radial gap is to prevail, the following relationships also apply:

$$|S_2| > S_4$$

and $$|S_2| \geqq S_3.$$

Practical experience teaches that contact surfaces should be avoided in the structure as far as possible in two rotating structural parts which move relative to each other, i.e. which also vibrate relative to each other. The wear of such surfaces cannot be controlled and in most cases would lead to premature function failures. The sizes and gap widths of the tangential play $S_2$ and the limiting gap $S_4$ are selected in such a manner that the vibration amplitudes occurring in normal operation cannot cause contact between the flange ring 11 and its driver dog 21 on one hand and cannot cause contact between the enlargement 14 of the holding ring 8 and the flange ring 11 on the other hand. Nevertheless, the tangential play $S_2$ is selected in such a way that the full utilization of the gap ($S_2$ = simple amplitude of the torsional vibration) still permits the mechanical stress of the compensator 6. The torsional moments of the compensator 6 which are exerted in this case on the holding ring 8, are smaller than the moment that would be required for rotating the holding ring 8 at the shaft 1. Accordingly, contact of the driver dog 21 at the sides of the axial slot 23 and sliding of the holding ring 8 on the sealing rings 16 is avoided during normal operation.

In a special case which occurs relatively rarely and only for a short period of time, a rotation of several degrees in both directions of rotation $+u$ and $-u$ may be expected. Without the proposed measure according to the invention, this rotation would destroy the compensator 6 immediately, but according to the invention, the driver dog 21 comes into contact with the sides of the axial slot 23 and carries the holding ring 8 along with the compensator clamp 6a, 7 if the play $\pm S_2$ is exceeded. In this case the compensator 6 is subjected to a maximum twist corresponding to the play $\pm S_2$ which was already taken into consideration during its construction. Since this extreme case only seldom occurs and then only for a short time, contact between the sides of the driver dog 21 and the sides of the axial slot 23 of the holding ring 8, is justifiable.

The choice of material and the chord deformation h of the sealing rings 16 between the inner hollow shaft 1 and the holding ring 8 are made in such a manner that a brief, jerky, mutual sliding motion is permitted without jeopardizing the sealing function. For this purpose, it is advantageous if the sealing rings 16 disposed between the inner hollow shaft 1 and the holding ring 8 and their metallic countersealing surfaces at the inner hollow shaft 1 as well as at the holding ring 8, are coated with a sliding agent. PTFE (polytetrafluoroethylene) is an example of a material which is a suitable sliding agent.

Recesses 11b, into which the driver dogs 21 are inserted, can be distributed over several points along the circumference of the flange ring 11, preferably with uniform distribution, so that the forces attacking at the driver dog 21 for relative shaft excursions are distributed over the circumference of the flange ring 11 and are accordingly also distributed over the circumference of the holding ring 8, which in this case would have to be provided with several axial slots 23 distributed over its circumference.

Simplified inspection and servicing of the compensator 6 are possible. This is because after disengaging the threaded bolts and removing the segments 17 and after loosening the fastening bolts 13, the holding ring 8 as well as the flange ring 11 can be axially outwardly drawn off together with the compensator 6 into a position in which the compensator 6 can be inspected and replaced, if necessary.

The invention is not limited to an application in rotors of superconducting generators; it can be used successfully anywhere in which a thermally mobile and sealing coupling is to be brought about between two normally synchronously revolving shaft parts which are concentrically disposed relative to each other with a ring gap and which normally revolve synchronously. Such a case could also apply to a rotor for single-phase a-c generators or associated steam turbine rotors, in which a central longitudinal borehole of the rotor is penetrated by a torsion shaft. One end of the shaft is connected to the hollow rotor and its other end is connected to a driving shaft or a bearing-supported shaft journal.

The foregoing is a description corresponding in substance to German Application No. P 34 07 275.6, filed Feb. 28, 1984, the International Priority of which is being claimed for the instant application, and which is hereby made part of this application. Any material discrepancies between the foregoing specification and the aforementioned corresponding German application are to be resolved in favor of the latter.

We claim:

1. Device for coupling two shafts of a rotating machine for permitting simultaneously a thermal dilatation and a sealing of the shafts with respect to each other, in combination with the shafts, comprising inner and outer normally synchronously rotating mutually concentric shafts defining a ring gap therebetween, at least said outer shaft being hollow defining a space between said shafts, an expansion compensator with a given maximal permissible twist disposed between the inner periphery of said outer shaft with one end and the outer periphery of said inner shaft with its other end sealing said space between said shafts and permitting relative axial, radial and tangential motion between said shafts, a holding ring rotatably and sealingly supported on said inner shaft connected sealingly to said other end of said expansion compensator thereby permitting a twisting movement thereof with respect to said inner shaft, and at least one driver element attached to said outer shaft engaging said inner shaft via said holding ring with tangential play ($S_2$) between said shafts being smaller than said given maximal permissible twist, said driver element mechanically connecting said holding ring and said other end of said expansion compensator to said outer shaft when twists of said expansion compensator exceed said tangential play ($S_2$).

2. Device according to claim 1, wherein said tangential play is substantially equal in the clockwise and counterclockwise directions during normal operation.

3. Device according to claim 1, wherein said inner shaft and said holding ring have metallic counter sealing surfaces, and including sealing rings disposed between said inner shaft and said holding ring and a sliding medium disposed on said sealing surfaces and said sealing rings.

4. Device according to claim 3, wherein said sliding medium is PTFE.

5. Device according to claim 1, wherein said inner shaft has a given maximum radial vibration amplitude during operation, said driver element is a driver dog, said outer shaft includes a shaft portion holding said driver dog, the inner periphery of said shaft portion is spaced from the outer periphery of said holding ring defining a ring gap and radial play ($S_4$) limiting radial movement of said inner shaft being larger than said given maximum radial vibration of said inner shaft, said driver dog dips into an axial slot formed in the outer periphery of said holding ring defining a slot bottom, and said driver dog has radial play ($S_3$) toward said slot bottom being larger than said radial play ($S_4$) between said holding ring and shaft portion, where:

$$|S_2| > S_4$$

and $$|S_2| \geq S_3.$$

6. Device according to claim 5, wherein said outer shaft has an end face and a shoulder, said shaft portion is a flange ring, and including threaded bolts clamping said flange ring against said end face forming a seal and centering said flange ring against said shoulder, the inner periphery of said flange ring serving as a fastening surface for said one end of said expansion compensator opposite its other end.

7. Device according to claim 6, wherein the axially outer end of said flange ring has at least one recess formed therein in which said driver dog is received and fastened.

8. Device according to claim 6, wherein the axially outer end of said flange ring has at least two recesses formed therein and distributed over the inner periphery of said flange ring and said outer shaft, one of said driver dogs being disposed and fastened in each respective recess.

* * * * *